United States Patent
VanBlon et al.

(10) Patent No.: US 11,120,071 B2
(45) Date of Patent: Sep. 14, 2021

(54) REVERSE IMAGE SEARCH USING PORTION OF IMAGE BUT NOT ENTIRETY OF IMAGE

(71) Applicant: Lenovo (Singapore) Pte. Ltd., Singapore (SG)

(72) Inventors: Russell Speight VanBlon, Raleigh, NC (US); Mark Patrick Delaney, Raleigh, NC (US); Nathan J. Peterson, Oxford, NC (US); John Carl Mese, Cary, NC (US); Arnold S. Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 72 days.

(21) Appl. No.: 16/688,980

(22) Filed: Nov. 19, 2019

(65) Prior Publication Data
US 2021/0149946 A1    May 20, 2021

(51) Int. Cl.
| G06F 3/048 | (2013.01) |
| G06F 16/532 | (2019.01) |
| G06T 11/60 | (2006.01) |
| G06F 3/0484 | (2013.01) |
| G06F 3/0488 | (2013.01) |
| G06K 9/20 | (2006.01) |

(52) U.S. Cl.
CPC ......... *G06F 16/532* (2019.01); *G06F 3/0488* (2013.01); *G06F 3/04845* (2013.01); *G06K 9/2081* (2013.01); *G06T 11/60* (2013.01); *G06T 2200/24* (2013.01); *G06T 2210/12* (2013.01)

(58) Field of Classification Search
None
See application file for complete search history.

(56) References Cited

U.S. PATENT DOCUMENTS

| 2010/0262616 A1* | 10/2010 | Eskolin | G06F 16/51 707/769 |
| 2014/0233066 A1* | 8/2014 | Luo | G06F 40/117 358/1.15 |
| 2015/0134688 A1* | 5/2015 | Jing | G06F 16/5866 707/766 |

* cited by examiner

*Primary Examiner* — William C Trapanese
(74) *Attorney, Agent, or Firm* — John M. Rogitz; John L. Rogitz (57) ABSTRACT

In one aspect, a device may include at least one processor and storage accessible to the at least one processor. The storage may include instructions executable by the at least one processor to receive user input selecting a portion of an image, where the portion of the image may not include the entirety of the image. The instructions may also be executable to, based on the user input, perform a reverse image search using the portion of the image but not the entirety of the image.

20 Claims, 5 Drawing Sheets

REVERSE IMAGE SEARCH USING PORTION OF IMAGE BUT NOT ENTIRETY OF IMAGE

FIELD

The present application relates to technically inventive, non-routine solutions that are necessarily rooted in computer technology and that produce concrete technical improvements.

BACKGROUND

As recognized herein, current reverse image search engines are only of limited value due to the fact that those engines often return results showing anything and everything matched from the initial image, leading to poor search results. There are currently no adequate solutions to the foregoing computer-related, technological problem.

SUMMARY

Accordingly, in one aspect a first device includes at least one processor and storage accessible to the at least one processor. The storage includes instructions executable by the at least one processor to receive user input selecting a portion of an image, with the portion of the image not including the entirety of the image. The instructions are also executable to, based on the user input, perform a reverse image search using the portion of the image but not the entirety of the image.

In some examples, the user input selecting the portion of the image may include user input to adjust the size of a box superimposed over the image as presented on a display. In these examples, the portion of the image may be a first portion of the image, and the instructions may be executable to receive user input selecting a second portion of the image, where the second portion may be different from the first portion and where the second portion may not include the entirety of the image. The instructions may then be executable to perform the reverse image search using the first portion of the image and not using the second portion of the image. In some implementations according to these examples, the box may be a first box and the user input selecting the second portion of the image may include user input to adjust the size of a second box superimposed on the image as presented on the display. The second box may be different from the first box. The first box may include green coloring but not red coloring, and the second box may include red coloring but not green coloring.

Additionally, in some implementations the instructions may be executable to, prior to receipt of the user input selecting the portion of the image, receive the image from a second device different from the first device.

Also in some implementations, the instructions may be executable to perform object recognition to identify a first object indicated in the portion of the image and, based on the user input and the identification of the first object, perform a reverse image search using the portion of the image to return one or more results indicating objects of the same type as the first object.

The first device may be embodied in a server. Additionally or alternatively, the first device may communicate with a server for performance of the reverse image search.

In another aspect, a method includes receiving user input selecting a portion of a first image, with the portion of the first image not including the entirety of the first image. The method also includes, based on the user input, using a search engine to perform a search for additional images matching an item shown in the first image.

In some examples, the method may include, based on the user input, using the search engine to perform the search for additional images at least in part by using the portion of the first image to identify additional images matching an item shown in the portion of the first image.

Additionally, in some implementations the method may include performing object recognition to identify the item as indicated in the portion of the first image and, based on the identification of the item, using the search engine to perform a search for additional images matching the item.

Also in some implementations, the method may include, based on the user input, using the search engine to perform the search for additional images at least in part by using the portion of the first image to identify additional images that do not match a first item shown in the portion but that match a second item shown elsewhere in the first image.

In certain examples, the user input selecting the portion of the first image may include user input to adjust the size of a box superimposed over the first image to surround the portion of the first image. Also in certain examples, the user input selecting the portion of the first image may include non-lateral-moving touch input to select the item as shown in the portion.

In another aspect, at least one computer readable storage medium (CRSM) that is not a transitory signal includes instructions executable by at least one processor to identify user input selecting a portion of a first image, where the portion of the first image does not include the entirety of the first image. The instructions are also executable to, based on the user input, use a search engine to return search results indicating items of the same type as an item shown in the first image.

In some examples, the instructions may be executable to, based on the user input, use the search engine to return search results indicating items of the same type as an item shown in the portion of the first image. The instructions may also be executable in some examples to, based on the user input, use the search engine to return search results indicating items of the same type as an item shown in the first image but outside the portion of the first image.

Still further, in some implementations the item may be a first item and the instructions may be executable to identify the user input selecting the portion of the first image and to identify user input selecting a portion of a second image. The portion of the second image may not include the entirety of the second image and the second image may be different from the first image. In these implementations, the instructions may then be executable to, based on the user input selecting the portion of the first image and the user input selecting the portion of the second image, use the search engine to return search results that indicate items of the same type as the first item as shown in the portion of the first image and that exclude items of the same type as a second item shown in the portion of the second image.

The details of present principles, both as to their structure and operation, can best be understood in reference to the accompanying drawings, in which like reference numerals refer to like parts, and in which:

DETAILED DESCRIPTION

The present application is related to reverse image searches, where an image (e.g., photograph) specified by a user may be used to locate additional information and images related to the content of the image specified by the user. This might be different from "regular" image searches where the user inputs a string of text to a search engine for executing a search for additional information (e.g., text) and images related to the content of the text string specified by the user. Thus, a reverse image search may take an image as the input query itself and returns results related to the image.

Consistent with present principles, a reverse image search may be performed where a user may highlight particular sections of an image that should match and/or that should not match any search results of the reverse image search. Thus, for example, a user might first upload an image to an image search engine (or upload an edited local image with include/exclude marks). The user may then highlight a portion(s) of the image to be included in the search with a green box and highlight a portion(s) of the image to be excluded from the search with a red box. The user may even use a sliding scale of percent match required for the content of each box (e.g., 100% would require perfect match to include or exclude). The user may then submit the search to the search engine, which may perform a reverse image search function using image subsections that have been highlighted to prioritize search results.

As an example, a user may take a picture using his or her smart phone of a car part, car electronics, or other object that happens to show other items in background. The user may then configure the search to include the car part, electronics, etc. and to exclude random items that might also appear in the image.

Furthermore, consistent with present principles certain portions of multiple images that are established by separate and distinct image files may also be used to perform a single reverse image search. For example, a user may mark "image A" or a portion thereof as being required in search results of a reverse image search, and may mark "image B" or a portion thereof as being excluded in search results of a reverse image search. The search engine may thus search for individual images that match both criteria within a single image.

What's more, as indicated above a user may apply weighting to each region of an image(s) to assign a priority of that region versus another region if multiple regions were specified for inclusion in a reverse image search to indicate to the search engine which regions selected for inclusion in the search should be prioritized over others.

Providing an example consistent with present principles, suppose a user takes a picture of a car and wants to find similar pictures using a reverse image search. The background of the picture might have a tree and a person and a storefront. The user could identify the car with a green box to perform a reverse image search for the car while also highlighting undesired portions of the image with a red box to not include in the reverse image search.

As another example, a user might provide multiple pictures of a car or car part to use for a reverse image search while specifying portions of each photo to exclude from the search since the excluded portions might otherwise cause more or irrelevant reverse image search results through which to sift. E.g., the user may take pictures of a part of the car's engine from multiple angles, upload the pictures to the search engine, and then highlight the same car part as shown in each image to perform a reverse image search to identify the car part so the user might know the name of the part to seek a replacement part. In so doing, other parts of the car's engine may not be identified and included in search results if not highlighted, or if highlighted for exclusion.

Prior to delving further into the details of the instant techniques, it is to be understood with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C # or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
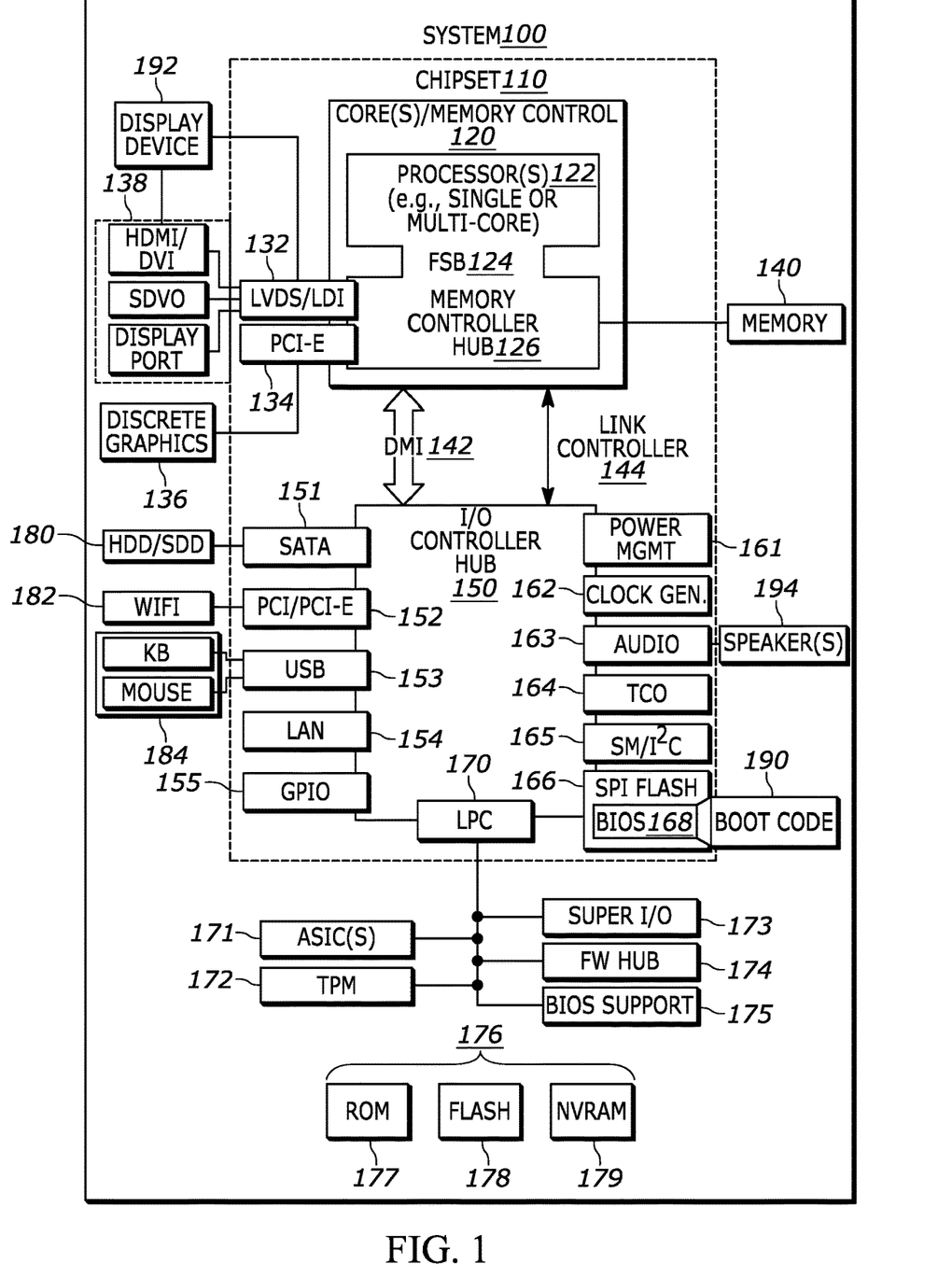
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multimaster serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
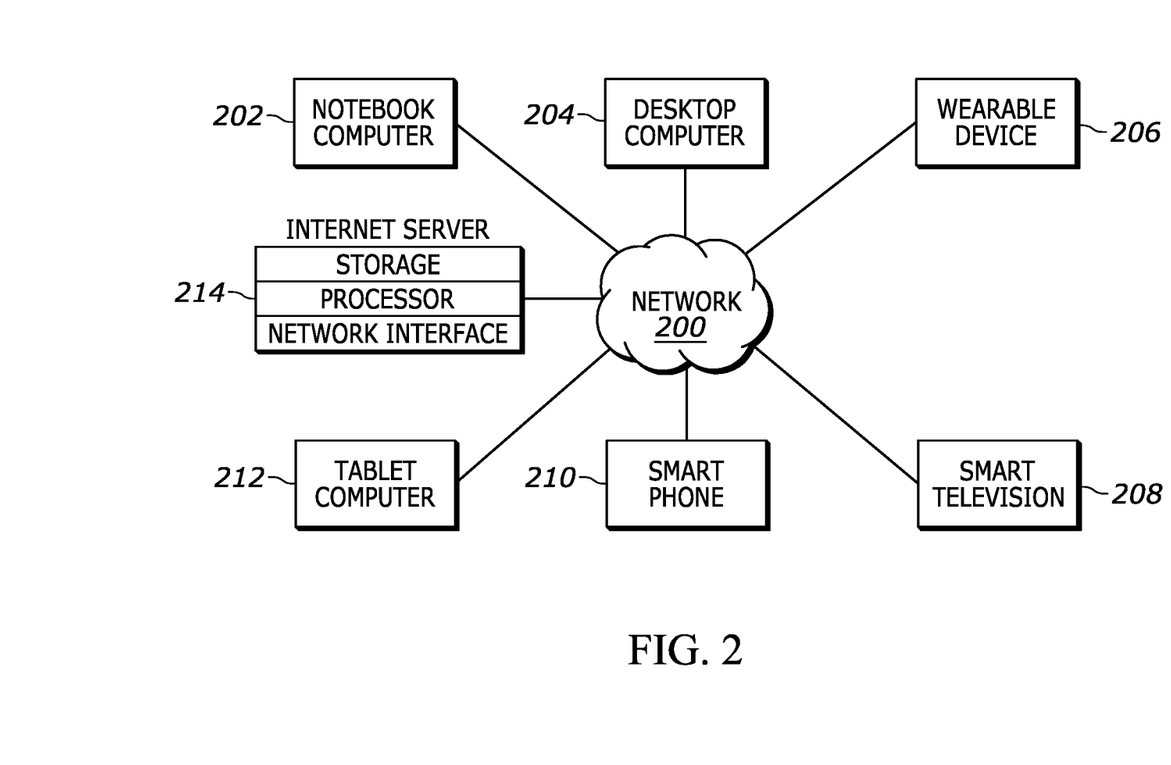
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
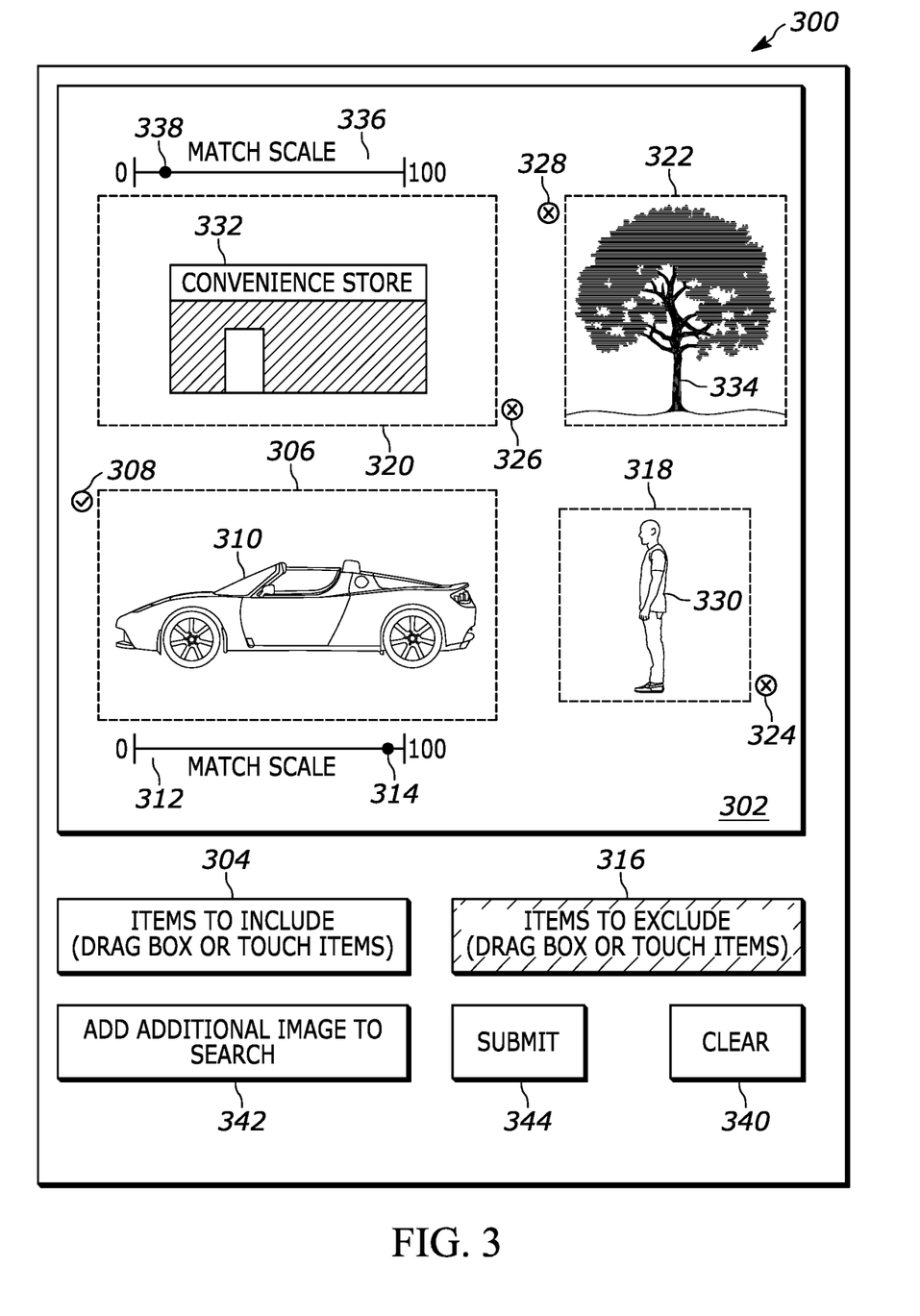
FIG. 3 shows an example graphical user interface (GUI) that may be presented on a display for specifying portions of an image to include in or exclude from a reverse image search consistent with present principles.

Now in reference to FIG. 3, it shows an example graphical user interface (GUI) 300 that is presentable on an electronic touch-enabled display of an end user device such as a smart phone or laptop computer. The GUI 300 may be accessed over the Internet using an Internet browser, accessed through a separate software application executing on the end user device, etc. A provider or operator of an Internet reverse image search engine may thus provide the GUI 300 through the Internet browser or the separate application in order for the end user to use the GUI 300 to specify an image for which the search engine is to perform a reverse image search to identify one or more additional images and other search result types that match the image. Accordingly, a first image 302 is shown in FIG. 3 as being the image specified by the end user.

The first image 302 may have been initially specified based on the end user providing a uniform resource locator (URL), web address, Internet protocol address, etc. to a text input field on another GUI (that might be presented prior to presentation of the GUI 300) in order to provide identifying information for the first image 302 itself to a remotely-located server that is associated with the search engine and that will be used to perform the reverse image search. This may be done so that the first image 302 can be looked up/accessed by the server.

The first image 302 may have also been initially specified based on the end user uploading the image 302 to the remotely-located server from local storage on the end user's device. This might be done based on the user selecting a browse button presented on another GUI (that again might be presented prior to presentation of the GUI 300), which may then be used to browse to a local file location on the end user's device (or elsewhere) at which the first image 302 is stored so that the first image 302 may then be uploaded to the remotely-located server.

Once uploaded, the GUI 300 may then be presented and show the first image 302 itself that was specified by the end user. The user may then proceed to select portions of the image 302 to use/include for reverse image searching, and even other portions of the image 302 to exclude from reverse image searching. This may help reduce or focus search results to only items in certain portions of the image 302 so that other items that happen to be shown in the image 302 but that the user does not deem as relevant to the search he or she wishes to perform will not be searched.

In order for the user to select one or more portions of the image 302 to use for reverse image searching, the user may first select a selector 304 using touch or cursor input to indicate that ensuing input will be input selecting one or more portions of the image 302 to use for reverse image searching. As shown, the selector 304 may include text indicating instructions for how to select portions of the image 302 that are less than the entirety of the image 302 that should be used for reverse image searching. In this case the instructions for selector 304 indicate that the user can use boxes in combination with drag and release actions using finger or cursor input to surround respective image portions that are to be used for reverse image searching. The instructions for selector 304 may also indicate that items shown in the image 302 may be touched using non-lateral-moving touch input to select a given item as shown in the image 302 (e.g., down/up input tapping the item without the user moving his or her finger across the outer surface of the display while making contact with the display).

Thus, once the user has selected the selector 304, the user may then proceed to select one or more portions of the image 302 to use in a reverse image search. To do so, the user may touch a certain item/object shown in the image 302 using non-lateral-moving touch input according to the preceding paragraph. The user may also do so by beginning a drag and release operation by selecting a point within the image 302 as presented on the display and then beginning to move the cursor or user's finger to another location on the display having both a different X coordinate and a different Y coordinate than the initial point. The user may do this without performing a release action yet, and this drag action may therefore cause a box to be rendered and change dimensions according to the user's movements to thus surround a desired portion of the image 302. Once the box has been adjusted to a desired size and/or positioned at a desired location within the image 302, the user may then perform the release action.

Accordingly, if a mouse and cursor were used, the user may press and hold a left click button on the mouse beginning at a point in the image 302 that the user wishes to establish as a corner of the box and then move the cursor to another display location to establish and expand/adjust the size of a box that is generated and superimposed over the image 302 responsive to the cursor movement. The user may then perform a release action by releasing the left-click button once the box has been positioned at a desired location and size. If touch input where used, the user may begin by touching a point in the image 302 that the user wishes to establish as a corner of the box and then move his or her finger across the display without breaking physical contact with the display to establish and expand/adjust the size of a box that is generated and superimposed over the image 302 responsive to the touch movement. The user may then perform a release action by removing his or her finger from touch contact with the display once the box has been positioned at a desired location and size.

Also note that whether by touch or cursor input, if desired once the release action has been performed the user may then select a corner of the box again and perform the same types of drag and release actions to further adjust the size of the box if desired. Additionally or alternatively, the user may select the box as a whole by selecting a center portion of it to move it about the image 302 to a desired location via another drag action before performing a release action to anchor the box at the new location.

An example box 306 is already shown in FIG. 3 as being established by a user according to one or more of the actions described above. The box may be presented in green coloring for its perimeter to indicate the portion of the image 302 that it surrounds is a portion of the image 302 that will be used for reverse image searching. A green check mark icon 308 may also be presented adjacent to the box to also indicate the portion of the image 302 that the box 306 surrounds is a portion of the image 302 that will be used for reverse image searching. In this example, the box 306 surrounds a vehicle 310 as shown in the image 302.

In some implementations, once the box 306 has been established according to user input as set forth above, a weighting scale 312 may also be presented beneath the box 306 as part of the GUI 300. A slider 314 on the scale 312 may be moved back and forth using touch or cursor input to weight, on a scale from zero to one hundred, the degree to which reverse image search results should match the visual content within the box 306. In this example, the slider 314 has been set to the integer ninety five.

As also reflected in FIG. 3, the user may select one or more other portions of the image 302 to exclude from reverse image searching. To do so, the user may first select selector 316 to indicate that ensuing input will be input selecting one or more portions of the image 302 to exclude from reverse image searching. In the present instance, selector 316 is shaded to indicate that it is the currently-selected selector (rather than the selector 304). As shown, the selector 316 may include text indicating instructions for how to select portions of the image 302 that are less than the entirety of the image 302 that should be excluded from reverse image searching. In this case, the instructions for selector 316 may indicate that the user can use non-lateral-moving touch input to indicate items within the image 302 to exclude from reverse image searching, and/or to establish boxes based on drag and release actions as described above to surround respective image portions that are to be excluded from reverse image searching.

Accordingly, once the selector 316 has been selected the user may then proceed to select one or more portions of the image 302 to exclude from the reverse image search that will be performed. To do so, the user may either use non-lateral-moving touch input and/or drag and release actions to establish boxes as set forth above. In the current example, the user has performed drag and release actions at different times to establish the boxes 318, 320, and 322 at their respective sizes and locations, each of which may therefore be superimposed over respective portions of the image 302.

Each of the boxes 318, 320, and 322 may be presented in red coloring for their perimeters to indicate that the respective portions of the image 302 that the respective boxes surround are portions of the image 302 that should be excluded from the reverse image search to be performed using the content within the box 306. Respective red "X" mark icons 324, 326, and 328 may also be presented adjacent to the respective boxes 318, 320, and 322 to also indicate the portions of the image 302 that the respective boxes 318, 320, and 322 surround are portions of the image 302 to be excluded from the reverse image search. In this example, the box 318 surrounds a person 330 shown in the foreground of the image 302, the box 320 surrounds a convenience store 332 shown in the middle ground of the image 302, and the box 322 surrounds a tree 334 shown in the background of the image 302.

As also shown in FIG. 3, once the boxes 318, 320, and 322 have been established according to user input as set forth above, a weighting scale may also be presented beneath each box as part of the GUI 300. However, only one weighting scale 336 is shown in FIG. 3 for box 320 for simplicity. A slider 338 on the scale 336 may be moved back and forth using touch or cursor input to weight, on a scale from zero to one hundred, the degree to which reverse image search results should exclude the visual content within the box 320. In this example, the slider 338 has been set to the integer ten.

As also shown in FIG. 3, the GUI 300 may include a clear selector 340. The clear selector 340 may be selected to provide a command to remove any and all boxes and/or item selections that have been performed by the user so that, while the image 302 remains presented via the GUI 300, the user may nonetheless start over should he or she wish to begin anew with selecting portions of the image 302 to include or exclude from a reverse image search.

Also shown in FIG. 3 is a selector 342 that may be selected for the user to add an additional, separate image to also use for a single reverse image search in combination with the image 302. Thus, selection of the selector 342 may initiate a process where the user may select an additional image according to one of the methods described above and then the additional image may also be presented on the GUI 300 beneath the image 302 so that the user may select additional items or image portions from that additional image to either include or exclude from the same reverse image search. The user may select those additional items or image portions from the additional image using the same methods described above.

Then once the user has selected various portions of the image 302 (and any portions of an additional image) to include or exclude from the reverse image search, the user may select the submit selector 344 to provide a command to the reverse image search engine to begin executing the reverse image search using the selected items/image portions.

Figure 4:
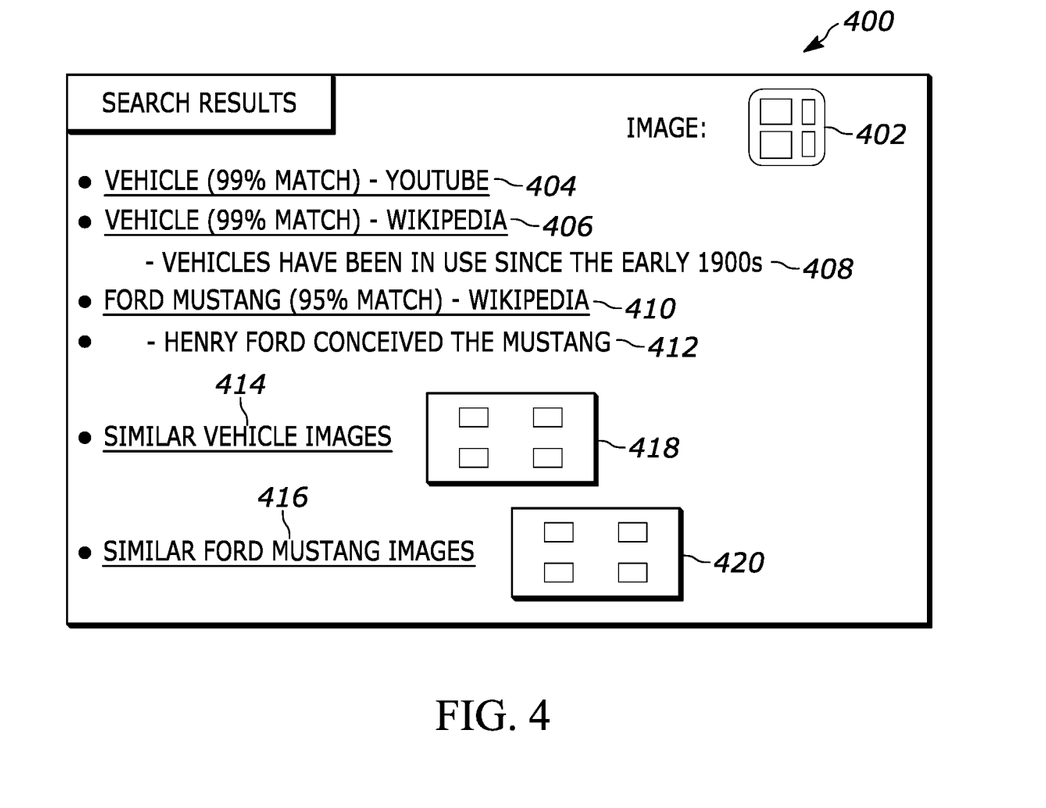
FIG. 4 shows example reverse image search results consistent with present principles.

Upon executing the reverse image search, the reverse image search engine executing at the remotely-located server may then transmit search results to the end user's device for presentation on the end user device's display, as shown in FIG. 4. Reference is thus now made to FIG. 4, which shows a GUI 400 indicating one or more search results from the reverse image search. As shown, the GUI 400 may include a thumbnail image 402 of the image 302 itself from FIG. 3, with the thumbnail image 402 also indicating the boxes 306, 318, 320, and 322 established by the user via the GUI 300.

As also shown in FIG. 4, various search results may also be listed on the GUI 400, with each search result being related to the vehicle 310 shown within the box 306 established by the user and with each search result excluding items/objects of the same or similar type as the items/objects surrounded by the "exclude" boxes 318, 320, and 322 (e.g., convenience stores, storefronts, people, and trees or flora in general). Accordingly, a first search result 404 may be presented in the form of a hyperlink that is selectable to command the user's device to access and begin presenting an online video from YouTube related to vehicles. The search result 404 may also indicate the percent match of the search result 404 to portion of the image 302 selected for the reverse image search (the vehicle shown in the image 302), as might be determined using fuzzy logic and/or an artificial intelligence model employing one or more deep neural networks.

A second search result 406 may also be presented in the form of a hyperlink to command the user's device to access and present a Wikipedia online encyclopedia webpage related to vehicles on the end user device's display. The search result 406 may also indicate textual information 408 related to vehicles, such as text from a beginning paragraph of the Wikipedia webpage itself. Also, note that the search result 406 may further indicate the percent match of the search result 406 to portion of the image 302 selected for the reverse image search.

Search results may be presented by percent match in descending order. Accordingly, the GUI 400 may present additional search results such as a search result 410 that includes a hyperlink to a Wikipedia webpage for Ford Mustangs owing to the reverse image search returning Ford Mustangs in particular as a ninety five percent match to the make and model of the vehicle 310 shown in the image 302, as also indicated in the search result 410. Textual information 412 may also be presented as part of the search result 410, where the textual information 412 may have been identified from a beginning paragraph of the Wikipedia webpage located at the URL for the hyperlink shown as part of the search result 410.

The GUI 400 may also include search results 414, 416 that may be respective hyperlinks to other respective search result pages. Hyperlink 414 may be selected to provide a command to present another search result page showing images of vehicles of various makes and models that have been determined to be similar to the image of the vehicle 310 that is shown in the image 302 and that exclude other items determined to be similar to the images of the person 330, convenience store 332, and tree 334 that are shown in the image 302. Thumbnails 418 of those images that have been determined to be visually similar to the image of the vehicle 310 may also be presented as a preview of the images that would be presented should the hyperlink 414 be selected.

Likewise, hyperlink 416 may be selected to provide a command to present another search result page showing images of Ford Mustangs in particular that have been determined to be similar to make and model of the vehicle 310 and that also exclude other items determined to be similar to the images of the person 330, convenience store 332, and tree 334 that are also shown in the image 302. Thumbnails 420 of Ford Mustang images that have been determined to be visually similar to the image of the vehicle 310 may also be presented as a preview of the images that would be presented should the hyperlink 416 be selected.

Figure 5:
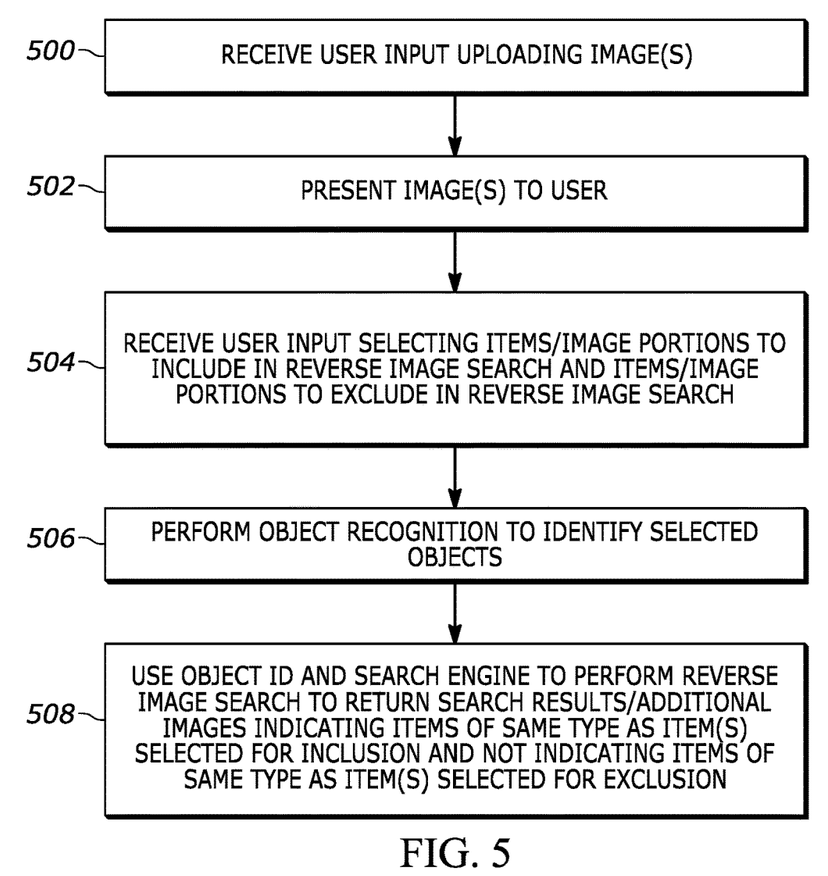
FIG. 5 shows a flow chart of an example algorithm consistent with present principles.

Referring now to FIG. 5, it shows example logic that may be executed by a device such as the system 100, a remotely-located server, and/or another device in communication with the remotely-located server (e.g., an end-user's device) for performing a reverse image search in accordance with present principles. Beginning at block 500, the device may receive user input specifying or uploading one or more images for which the user will select respective portions for inclusion in or exclusion from a single reverse image search as described above. From block 500 the logic may proceed to block 502.

At block 502 the device may transmit a GUI such as the GUI 300 for presentation at the end user's device to thus present the specified/uploaded image(s) to the user for the user to then provide input received at block 504 that specifies/selects one or more items or image portions to include in the reverse image search and items or image portions to exclude from the reverse image search as described above. From block 504 the logic may then proceed to block 506.

At block 506 the device may execute boundary recognition and object recognition algorithms to identify any objects from the image(s) that were touched by the user using non-lateral-moving touch input. The device may also execute boundary recognition and object recognition algorithms to identify any objects from the image(s) that were also selected using a box as described above. This may occur both for items/image portions to include as well as for items/image portions to exclude. The logic may then proceed to block 508.

At block 508 the device may use the object identification that was identified at block 506 (e.g., a "vehicle" according to the example above) and use the reverse image search engine associated with the device (e.g., hosted on it) to perform a reverse image search. The search may be performed using one or more reverse image search algorithms and/or artificial intelligence models similar to those developed by Google, TinEye, and Reddit for reverse image searching. The search may thus return search results, such as additional images, that indicate items of the same type (e.g., same object ID) as one or more items/image portions selected from the image(s) for inclusion in the search and that do not indicate items of the same type (e.g., same object ID) as one or more items/image portions selected from the image(s) for exclusion from the search.

Figure 6:
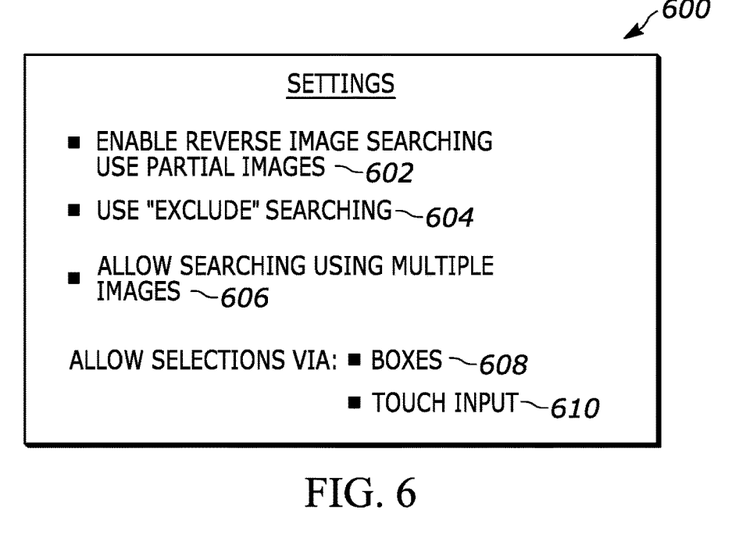
FIG. 6 shows an example GUI for configuring one or more settings of a search engine operating consistent with present principles.

Continuing the detailed description in reference to FIG. 6, it shows an example GUI 600 that may be presented on the display of a device such as a remotely-located server, the device undertaking the logic of FIG. 5, and/or a system administrator's device that has access to the server. The GUI 600 may be used to configure one or more settings of a search engine that performs reverse image searches consistent with present principles. It is to be understood that each of the options to be described below may be selected by selecting the respective check box shown adjacent to the respective option using touch or cursor input.

As shown in FIG. 6, the GUI 600 may include a first option 602 that may be selected to set or configure the server/search engine to perform reverse image searches using portions of images specified by a user for inclusion and/or exclusion consistent with present principles (rather than using the image as a whole). The option 602 may therefore be presented to configure the server/search engine to perform the actions described above with respect to FIGS. 3-5.

The GUI 600 may also include an option 604 that may be selected to set or configure the server/search engine to specifically permit "exclude" searching in particular, where a user may specify not only items/image portions to include in a given reverse image search but to also specify items/images portions to exclude from the reverse image search as disclosed herein.

As also shown in FIG. 6, the GUI 600 may include an option 606 that may be selected to set or configure the server/search engine to permit reverse image searching where a single reverse image search may be performed using items/image portions specified by a user from among plural images consistent with present principles. If desired, the GUI 600 may also include options 608, 610 to respectively permit use of boxes and use of non-lateral-moving touch input to select various items or image portions for inclusion in or exclusion from a reverse image search.

It may now be appreciated that present principles provide for an improved computer-based user interface and search engine that improve the functionality and ease of use of the devices and technologies disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
at least one processor;
storage accessible to the at least one processor and comprising instructions executable by the at least one processor to:
present a graphical user interface (GUI) on a display accessible to the at least one processor, the GUI comprising a first selector that is selectable to indicate that ensuing user input will be input selecting one or more portions of an image to use for reverse image searching, the GUI comprising a second selector different from the first selector, the second selector being selectable to indicate that ensuing user input will be input selecting one or more portions of the image to not use for reverse image searching;
receive user input selecting a portion of the image, the portion of the image not comprising the entirety of the image;
based on the first selector being selected while the portion is selected, indicate via a first icon presented on the display that the portion of the image will be used for reverse image searching;
based on the second selector being selected while the portion is selected, indicate via a second icon presented on the display that the portion of the image will not be used for reverse image searching, the second icon being different from the first icon; and
perform a reverse image search either using or not using the portion, respectively, according to which of the first and second selectors is selected while the portion is selected.

2. The first device of claim 1, wherein the user input selecting the portion of the image comprises user input to adjust the size of a box superimposed over the image as presented on the GUI.

3. The first device of claim 2, wherein the portion of the image is a first portion of the image, and wherein the instructions are executable to:
receive user input selecting a second portion of the image, the second portion being different from the first portion, the second portion not comprising the entirety of the image; and
perform the reverse image search using the first portion of the image and not using the second portion of the image.

4. The first device of claim 3, wherein the box is a first box, and wherein the user input selecting the second portion of the image comprises user input to adjust the size of a second box superimposed on the image as presented on the GUI, the second box being different from the first box.

5. The first device of claim 4, wherein the first box comprises green coloring but not red coloring, and wherein the second box comprises red coloring but not green coloring.

6. The first device of claim 1, wherein the instructions are executable to:
perform object recognition to identify a first object indicated in the portion of the image; and
based on the user input and the identification of the first object, perform a reverse image search using the portion of the image to return one or more results indicating objects of the same type as the first object.

7. The first device of claim 1, wherein the first device is embodied in a server.

8. The first device of claim 1, wherein the first device communicates with a server for performance of the reverse image search.

9. The first device of claim 1, comprising the display.

10. The first device of claim 1, wherein the image is a first image, and wherein the GUI comprises a third selector different from the first and second selectors, the third selector being selectable to add an additional image to use as part of the same reverse image search.

11. The first device of claim 1, wherein based on receipt of first user input to select the portion as received while the first selector is selected, the GUI presents a weighting scale for the selected portion of the image, the weighting scale being manipulable by a user to indicate a percent match that a search result of the reverse image search should have to the selected portion of the image.

12. The first device of claim 11, wherein the selected portion of the image is a first selected portion, wherein the weighting scale is a first weighting scale, and wherein based on receipt of second user input to select a second portion of the image as received while the second selector is selected, the GUI presents a second weighting scale for the second selected portion of the image, the second weighting scale being manipulable by a user to indicate a degree to which a search result of the reverse image search should exclude the type of object shown in the second selected portion of the image.

13. The first device of claim 1, wherein the GUI is a first GUI, and wherein the instructions are executable to:
present a second GUI on the display, the second GUI being different from the first GUI, the second GUI being usable to configure one or more settings related to reverse image searching, the second GUI comprising an option that is selectable to enable a system to perform reverse image searching using some but not all of a given image.

14. The first device of claim 13, wherein the system comprises the first device.

15. The first device of claim 1, wherein the GUI is a first GUI, and wherein the instructions are executable to:
present a second GUI on the display, the second GUI being different from the first GUI, the second GUI presenting search results of the reverse image search, the second GUI comprising a thumbnail of the image, the thumbnail as presented on the second GUI comprising one or more graphical objects indicating respective portions of the image that were selected using the first GUI.

16. A method, comprising:
presenting a graphical user interface (GUI) on a display, the GUI comprising a first selector that is selectable to indicate that ensuing user input will be input selecting one or more portions of a first image to use for searching, the GUI comprising a second selector different from the first selector, the second selector being selectable to indicate that ensuing user input will be input selecting one or more portions of the first image to not use for searching;
receiving user input selecting a portion of the first image, the portion of the first image not comprising the entirety of the first image;
based on the first selector being selected while the portion is selected, indicate via a first graphical object presented on the display that the portion of the first image will be used for searching;
based on the second selector being selected while the portion is selected, indicate via a second graphical object presented on the display that the portion of the first image will not be used for searching, the second graphical object being different from the first graphical object; and
using a search engine to perform a search either using or not using the portion, respectively, according to which of the first and second selectors is selected while the portion is selected.

17. The method of claim 16, wherein the GUI comprises a third selector different from the first and second selectors, the third selector being selectable to add an additional image to use as part of the same search.

18. The method of claim 16, wherein based on receipt of first user input to select the portion as received while the first selector is selected, the GUI presents a weighting scale for the selected portion of the image, the weighting scale being manipulable by a user to indicate an amount of match that a search result of the search should have to the selected portion of the image.

19. The method of claim 16, wherein the GUI is a first GUI, and wherein the method comprises:
presenting a second GUI on the display, the second GUI being different from the first GUI, the second GUI presenting search results of the search, the second GUI comprising a thumbnail of the image, the thumbnail as presented on the second GUI comprising one or more graphical objects indicating respective portions of the image that were selected using the first GUI.

20. At least one computer readable storage medium (CRSM) that is not a transitory signal, the computer readable storage medium comprising instructions executable by at least one processor to:
present a graphical user interface (GUI) on a display accessible to the at least one processor, the GUI comprising a first selector that is selectable to indicate that ensuing user input will be input selecting one or more portions of an image to use for searching, the GUI comprising a second selector different from the first selector, the second selector being selectable to indicate that ensuing user input will be input selecting one or more portions of the image to not use for searching;
receive user input selecting a portion of the image, the portion of the image not comprising the entirety of the image;
based on the first selector being selected while the portion is selected, indicate via a first graphical object presented on the display that the portion of the image will be used for searching;
based on the second selector being selected while the portion is selected, indicate via a second graphical object presented on the display that the portion of the image will not be used for searching, the second graphical object being different from the first graphical object; and
use a search engine either using or not using the portion, respectively, according to which of the first and second selectors is selected while the portion is selected in order to return search results.

* * * * *